(12) United States Patent
Landvik et al.

(10) Patent No.: US 7,507,468 B2
(45) Date of Patent: *Mar. 24, 2009

(54) LAMINATED VISCO-ELASTIC SUPPORT

(75) Inventors: Dag Landvik, Saltsjo-Duvnas (SE); Michael B. Allaway, Paris (FR)

(73) Assignee: Tempur-Pedic Management, Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/403,255

(22) Filed: Mar. 31, 2003
(Under 37 CFR 1.47)

(65) Prior Publication Data

US 2004/0033351 A1    Feb. 19, 2004

Related U.S. Application Data

(63) Continuation of application No. 09/703,893, filed on Nov. 1, 2000, now Pat. No. 6,541,094, and a continuation of application No. 08/458,968, filed on Jun. 2, 1995, now Pat. No. 6,159,574.

(30) Foreign Application Priority Data

Mar. 6, 1994 (GB) .................................. 9411120.0
Sep. 6, 1994 (GB) .................................. 9411504.5

(51) Int. Cl.
*B32B 3/26* (2006.01)
(52) U.S. Cl. ...................... 428/316.6; 428/71; 428/217; 428/319.3; 428/315.9; 442/221; 442/370
(58) Field of Classification Search .............. 428/316.6, 428/71, 217, 319.3, 315.9; 442/221, 370
See application file for complete search history.

(56) References Cited

U.S. PATENT DOCUMENTS

| | | | |
|---|---|---|---|
| 2,604,642 A | 7/1952 | Marco |
| 2,651,788 A | 9/1953 | Forwood |
| 2,835,313 A | 5/1958 | Dodge |
| 2,836,228 A | 5/1958 | Dahle |
| 2,898,975 A | 8/1959 | Wagner |
| 3,000,020 A | 9/1961 | Lombard et al. |
| 3,043,731 A | 7/1962 | Hill |
| 3,047,888 A | 8/1962 | Schecter et al. |
| 3,608,106 A | 9/1971 | Parramon |

(Continued)

FOREIGN PATENT DOCUMENTS

CH            678390 A5        9/1991

(Continued)

OTHER PUBLICATIONS

The article "The Comfort Store", 5 pages, 1994.*

(Continued)

*Primary Examiner*—Hai Vo
(74) *Attorney, Agent, or Firm*—Michael Best & Friedrich LLP

(57) ABSTRACT

A laminated support for pressure-relief comprising an upper layer of visco-elastic foam, a middle layer of visco-elastic foam having a greater hardness, and a bottom layer of highly resilient polyurethane foam. These layers are sandwiched between two layers of reticulated filter polyurethane foam.

27 Claims, 2 Drawing Sheets

U.S. PATENT DOCUMENTS

| | | |
|---|---|---|
| 3,742,526 A | 7/1973 | Lillard |
| 3,833,259 A | 9/1974 | Pershing |
| 3,906,137 A | 9/1975 | Bauer |
| 3,939,508 A | 2/1976 | Hall et al. |
| 3,974,532 A | 8/1976 | Ecchuya |
| 3,987,507 A | 10/1976 | Hall |
| 4,031,579 A * | 6/1977 | Larned .................. 5/652.1 |
| 4,086,675 A | 5/1978 | Talbert et al. |
| 4,147,825 A | 4/1979 | Talalay |
| 4,167,612 A | 9/1979 | Tucker et al. |
| 4,190,697 A | 2/1980 | Ahrens |
| 4,207,636 A | 6/1980 | Ceriani |
| 4,254,991 A | 3/1981 | Venieris |
| 4,256,096 A | 3/1981 | Budde |
| 4,336,621 A | 6/1982 | Schwartz et al. |
| 4,379,856 A | 4/1983 | Samaritter et al. |
| 4,449,261 A | 5/1984 | Magnusson |
| 4,580,301 A | 4/1986 | Ludman et al. |
| 4,606,088 A | 8/1986 | Michaelson et al. |
| 4,736,911 A | 4/1988 | Heitmann |
| 4,748,768 A | 6/1988 | Jacobsen |
| 4,755,411 A | 7/1988 | Wing et al. |
| 4,756,949 A | 7/1988 | Spence et al. |
| 4,808,469 A | 2/1989 | Hiles |
| 4,840,430 A | 6/1989 | Shimada |
| 4,842,330 A | 6/1989 | Jay |
| 4,843,662 A | 7/1989 | Handelman |
| 4,856,118 A | 8/1989 | Sapiejewski |
| 4,947,500 A | 8/1990 | Seiler |
| 4,955,095 A | 9/1990 | Gerrick |
| 4,987,156 A | 1/1991 | Tozune et al. |
| 4,999,868 A | 3/1991 | Kraft |
| 5,018,790 A | 5/1991 | Jay |
| 5,027,589 A | 7/1991 | Gleb et al. |
| 5,031,261 A | 7/1991 | Fenner, Sr. |
| 5,068,983 A | 12/1991 | Marc |
| 5,081,728 A | 1/1992 | Skinner |
| 5,117,519 A | 6/1992 | Thomas |
| 5,172,436 A | 12/1992 | Masuda |
| 5,189,747 A | 3/1993 | Mundy et al. |
| 5,230,947 A | 7/1993 | Ou |
| 5,231,717 A | 8/1993 | Scott et al. |
| 5,265,295 A | 11/1993 | Sturgis |
| 5,294,181 A | 3/1994 | Rose et al. |
| 5,428,852 A | 7/1995 | Tenuta et al. |
| 5,513,402 A | 5/1996 | Schwartz |
| 5,518,802 A | 5/1996 | Colvin et al. |
| 5,522,106 A | 6/1996 | Harrison et al. |
| 5,669,094 A | 9/1997 | Swanson |
| 5,687,436 A | 11/1997 | Denton |
| 5,741,568 A | 4/1998 | Rudy |
| 5,747,140 A | 5/1998 | Heerklotz |
| 5,815,865 A | 10/1998 | Washburn et al. |
| 5,836,654 A | 11/1998 | DeBellis et al. |
| 5,855,415 A | 1/1999 | Lilley, Jr. |
| 5,857,749 A | 1/1999 | DeBellis et al. |
| 5,913,774 A | 6/1999 | Feddema |
| 6,018,832 A | 2/2000 | Graebe |
| 6,052,851 A | 4/2000 | Kohnle |
| 6,061,856 A | 5/2000 | Hoffmann |
| 6,093,468 A | 7/2000 | Toms et al. |
| 6,115,861 A | 9/2000 | Reeder et al. |
| 6,127,010 A | 10/2000 | Rudy |
| 6,159,574 A | 12/2000 | Landvik et al. |
| 6,163,907 A | 12/2000 | Larson |
| 6,202,239 B1 | 3/2001 | Ward et al. |
| 6,237,173 B1 | 5/2001 | Schlichter et al. |
| 6,241,320 B1 | 6/2001 | Chew et al. |
| 6,256,821 B1 | 7/2001 | Boyd |
| 6,397,419 B1 | 6/2002 | Mechache |
| 6,460,209 B1 | 10/2002 | Reeder et al. |
| 6,481,033 B2 | 11/2002 | Fogel |
| 6,541,094 B1 | 4/2003 | Landvik et al. |
| 6,578,220 B1 | 6/2003 | Smith |
| 6,598,251 B2 | 7/2003 | Habboub et al. |
| 6,601,253 B1 | 8/2003 | Tarquinio |
| 6,602,579 B2 * | 8/2003 | Landvik .................. 428/158 |
| 6,662,393 B2 | 12/2003 | Boyd |
| 6,687,933 B2 | 2/2004 | Habboub et al. |
| 6,687,935 B2 | 2/2004 | Reeder et al. |
| 6,709,729 B2 | 3/2004 | Baruch |
| 6,735,800 B1 | 5/2004 | Salvatini et al. |
| 6,745,419 B1 | 6/2004 | Delfs et al. |
| 6,785,923 B2 | 9/2004 | Karafa et al. |
| 6,787,078 B2 | 9/2004 | English et al. |
| 6,866,915 B2 * | 3/2005 | Landvik .................. 428/158 |
| 6,952,852 B2 | 10/2005 | Reeder et al. |
| 7,036,172 B2 | 5/2006 | Torbet et al. |
| 7,059,001 B2 | 6/2006 | Woolfson |
| 7,065,816 B2 | 6/2006 | McGettigan |
| 7,103,933 B2 | 9/2006 | Gladney et al. |
| 7,155,765 B2 | 1/2007 | Fogg |
| 7,200,884 B2 | 4/2007 | Wright et al. |
| 2003/0135930 A1 | 7/2003 | Varese et al. |
| 2003/0186044 A1 | 10/2003 | Sauniere et al. |
| 2004/0074008 A1 | 4/2004 | Martens et al. |
| 2004/0139552 A1 | 7/2004 | Walters, Jr. |
| 2004/0142619 A1 | 7/2004 | Ueno et al. |
| 2004/0209062 A1 | 10/2004 | Sebag |
| 2005/0084667 A1* | 4/2005 | Landvik et al. ......... 428/316.6 |
| 2005/0140199 A1 | 6/2005 | Kang et al. |
| 2005/0210595 A1 | 9/2005 | Di Stasio et al. |
| 2006/0031996 A1 | 2/2006 | Rawls-Meehan |
| 2006/0260059 A1 | 11/2006 | Apperson et al. |
| 2006/0260060 A1 | 11/2006 | Apperson et al. |

FOREIGN PATENT DOCUMENTS

| | | |
|---|---|---|
| DE | 1654301 | 3/1971 |
| DE | 3321720 | 12/1984 |
| DE | 3803448 C | 8/1988 |
| DE | 10037888 | 6/2002 |
| DE | 202004003248 | 5/2004 |
| DE | 20023506 | 8/2004 |
| DE | 202004004701 | 8/2004 |
| EP | 0338463 | 4/1989 |
| EP | 0486016 | 5/1992 |
| EP | 0713900 | 5/1996 |
| EP | 0718144 | 6/1996 |
| EP | 0777988 | 6/1997 |
| EP | 0782830 | 7/1997 |
| EP | 0962171 | 12/1999 |
| EP | 1192925 | 4/2002 |
| EP | 1430814 | 6/2004 |
| FR | 2598910 | 11/1987 |
| FR | 2795371 | 12/2000 |
| FR | 2818187 | 6/2002 |
| FR | 2848817 | 6/2004 |
| GB | 2244000 A * | 11/1991 |
| GB | 2290256 | 12/1995 |
| GB | 2297057 | 7/1996 |
| GB | 2410892 | 8/2005 |
| IT | 1238272 | 7/1993 |
| IT | 00224783 | 6/1996 |
| JP | 62-183790 | 8/1987 |
| JP | 3128006 | 5/1991 |
| WO | WO8504150 | 9/1985 |
| WO | WO9850251 | 11/1998 |

| | | |
|---|---|---|
| WO | WO0128388 | 10/2000 |
| WO | WO03072391 | 9/2003 |
| WO | WO2004089682 | 10/2004 |
| WO | WO2005011442 | 2/2005 |
| WO | WO2005046988 | 5/2005 |

OTHER PUBLICATIONS

The article "Tempur-Pedic Investor Relations: Investor FAQ", 2006, 2 pages.*

* cited by examiner

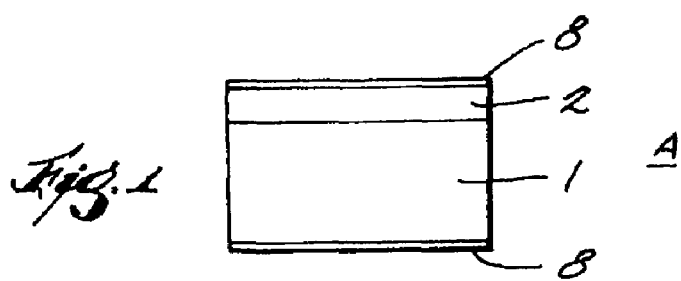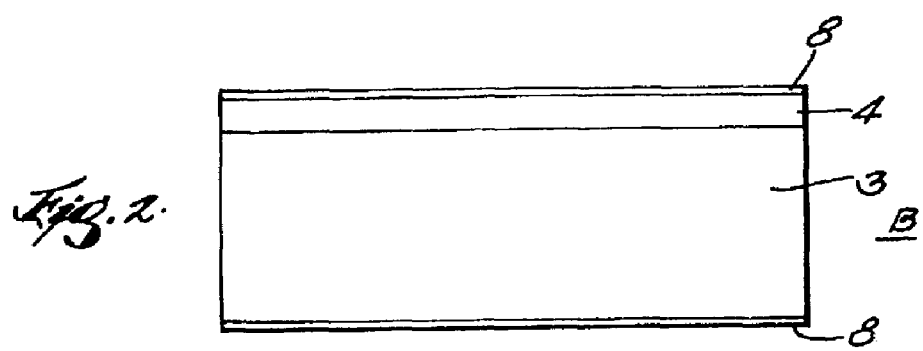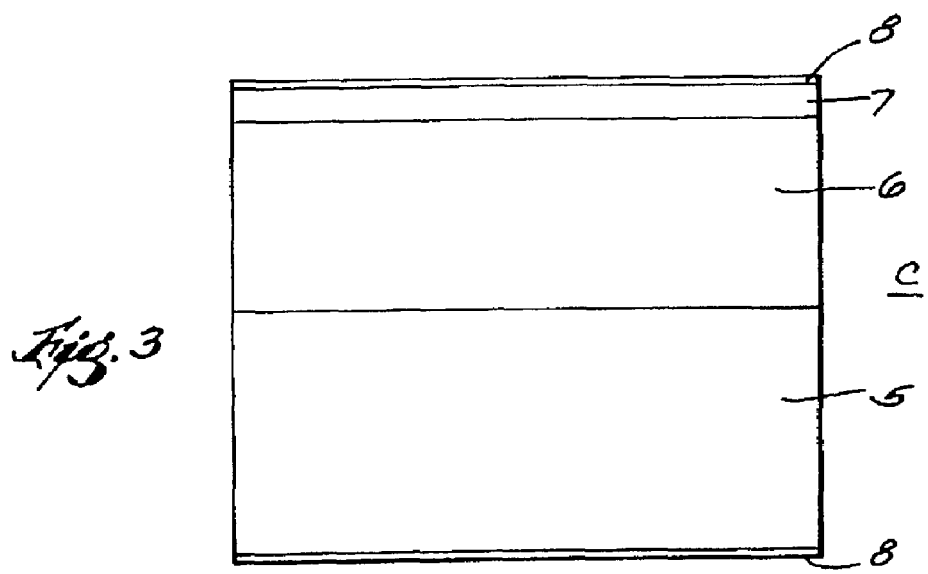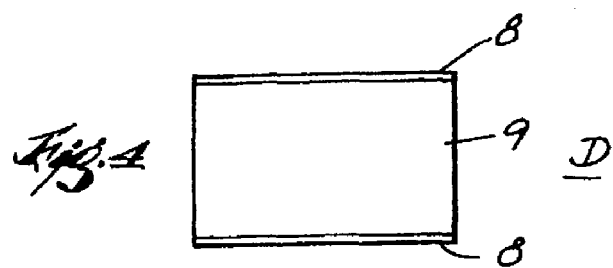

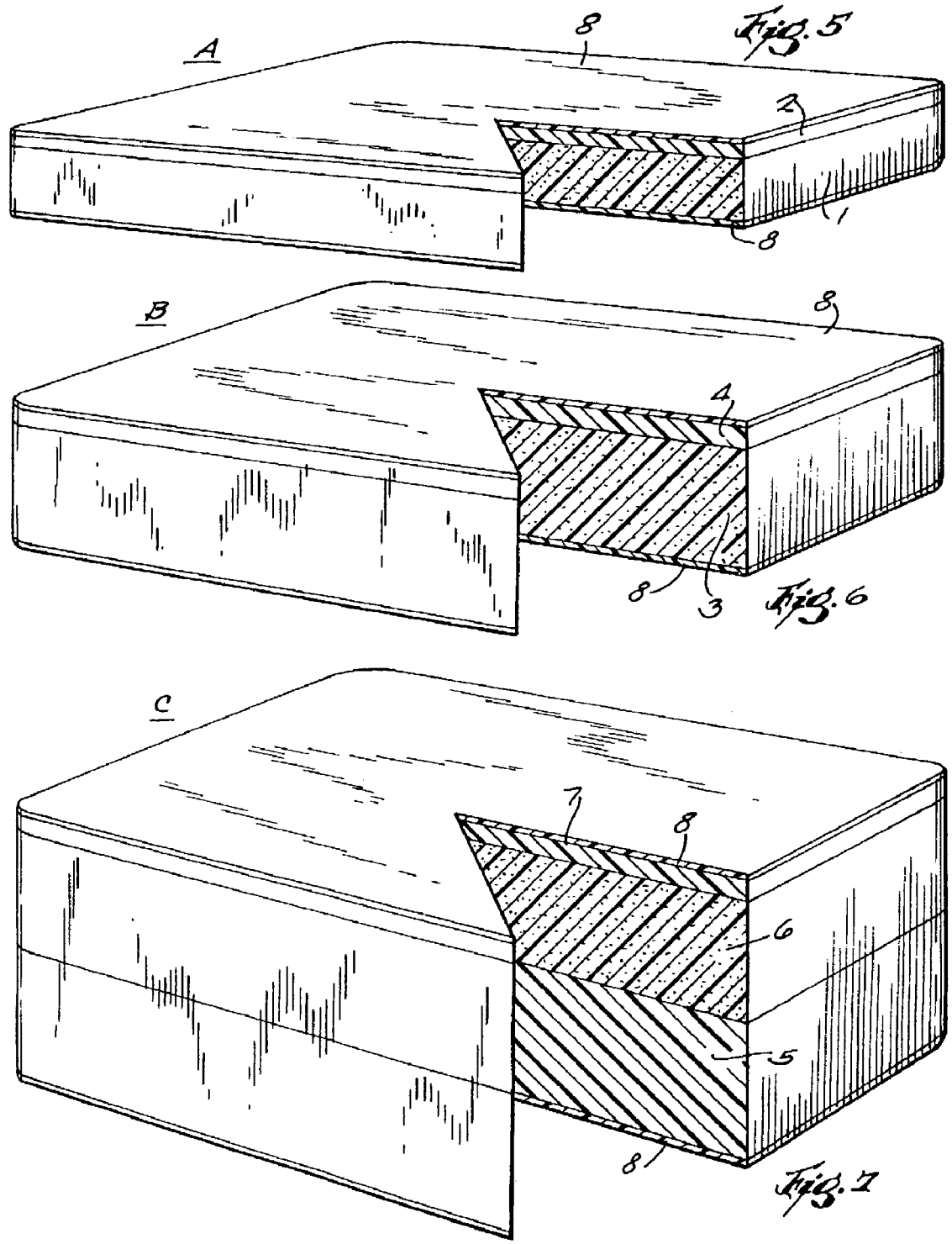

LAMINATED VISCO-ELASTIC SUPPORT

CROSS-REFERENCE TO RELATED APPLICATION

This is a continuation of U.S. patent application Ser. No. 09/703,893, which as filed on Nov. 1, 2000, now U.S. Pat. No. 6,541,094, which issued on Apr. 1, 2003, and is a continuation of Ser. No. 08/458,968, now U.S. Pat. No. 6,159,574, filed on Jun. 2, 1995 which issued Dec. 12, 2000, the entire contents of which are incorporated herein by reference. Priority is also hereby claimed to United Kingdom Patent Application Number 9411120.0 filed on Jun. 3. 1994, and to United Kingdom Patent Application Number 9411504.5 filed on Jun. 9, 1994, the entire contents of which are also incorporated herein by reference.

BACKGROUND OF THE INVENTION

1. Technical Field

The invention relates to mattresses and cushions, and more particularly to supports made of visco-elastic material.

2. Related Prior Art

Mattresses and cushions used every day in homes and hospitals are not well-suited for people requiring pressure-relief. In hospitals, for example, long-term patients often suffer from pressure sores.

SUMMARY OF THE INVENTION

Known supports made of standard polyurethane foam do not provide even or well-distributed support of a body reclining thereon because of the polyurethane material. Such known standard supports have a spring-like characteristic that tends to return an increased reactive force in response to increasingly large forces on the support. Moreover, the greater the deflection of the polyurethane support, the greater the reactive force provided by the standard support. This spring-like characteristic is undesirable in the case of long-term patient care because the points at which the greatest pressure occurs are the points at which pressure sores can be formed.

Changing the density of the standard polyurethane foam used in such known supports does not improve the performance of such known supports. For example, use of a lower density foam requires a thicker, bulkier cushion or mattress, which can easily become unwieldy or unstable, and can still result in pressure points because of the inherent spring-like nature of the polyurethane foams. Also, if a sufficiently large force is applied to a support made of low density polyurethane foam, it is possible that the force will "bottom out" or act through the support and onto whatever structure lies below or behind the support.

The present invention therefore seeks to provide improved supports, such as mattresses and cushions, for pressure-relief.

According to the present invention there is provided a laminated support for pressure-relief comprising at least two layers of foam adhered together, wherein at least one layer is a visco-elastic foam.

In one embodiment, the laminated support comprises two layers of visco-elastic foam adhered together, wherein one layer of visco-elastic foam has a greater hardness than the other layer. The laminated support may further comprise a layer of polyurethane foam adhered to the layers of visco-elastic foam.

In another embodiment, the laminated support comprises a single layer of visco-elastic foam and a single layer of polyurethane foam adhered together.

The visco-elastic properties of the laminated support respond to a combination of body weight and body temperature. In particular, visco-elastic foam supports tend to soften when heated, and therefore tend to soften in response to body heat. As a result, relatively hard visco-elastic material will initially firmly support a body lying thereon and will soften at the pressure points. Thus, the support subsequently gently molds to the form of the body, allowing pressure to be absorbed uniformly and distributed evenly across the support. This property is of particular benefit in the prevention and healing of pressure sores.

Other features and advantages of the invention will become apparent to those skilled in the art upon review of the following detailed description, claims and drawings.

BRIEF DESCRIPTION OF THE DRAWINGS

FIG. 1 shows a side view of a support embodying the present invention.

FIG. 2 shows a side view of a support that is an alternative embodiment of the present invention.

FIG. 3 shows a side view of a support that is a second alternative embodiment of the present invention.

FIG. 4 shows a side view of a support that is a third alternative embodiment of the invention.

FIG. 5 is a perspective view in partial cross section of the support shown in FIG. 1.

FIG. 6 is a perspective view in partial cross section of the support shown in FIG. 2.

FIG. 7 is a perspective view in partial cross section of the support shown in FIG. 3.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting.

DETAILED DESCRIPTION OF THE PREFERRED EMBODIMENT

The support or cushion A shown in FIGS. 1 and 5 includes a bottom layer 1 of 40 mm thick visco-elastic foam having a density of 110 kg/m$^3$ and a hardness of 30N, and a top layer 2 of 10 mm thick visco-elastic foam having a density of 85 kg/m3 and a hardness of 10N.

The support B shown in FIGS. 2 and 6 is well-suited for use as an overlay which can be placed on top of an existing mattress to provide extra comfort and pressure-relief. The overlay B includes a bottom layer 3 of 60 mm thick visco-elastic foam having a density of 83 kg/m$^3$ and a hardness of 13N, and a top layer 4 of 10 mm thick visco-elastic foam having a density of 83 kg/m$^3$ and a hardness of 10N. A support similar to the construction of support B could also be manufactured to include a bottom layer of 80 mm thick highly resilient polyurethane foam having a density of 35 kg/m$^3$ and a hardness of 12N, and a top layer of 70 mm thick visco-elastic foam having a density of 82 kg/m$^3$ and a hardness of 13N.

The support C shown in FIGS. 3 and 7 is well-suited for use as a mattress and includes a bottom layer 5 of 75 mm thick polyurethane foam having a density of 35 kg/m³, a middle layer 6 of 60 mm thick visco-elastic foam having a density of 83 kg/m³ and a hardness of 13N, and a top layer 7 of 10 mm deep visco-elastic foam having a density of 83 kg/m³ and a hardness of 10N.

Suitable polyurethane foams are manufactured by A/S Dan-Foam, 5560 Arup, Denmark. One example of a polyurethane foam has the manufacturer's code HE35S.

Similarly, suitable visco-elastic foams are made by A/S Dan-Foam, 5560 Arup, Denmark and sold under the trade mark TEMPUR. One such visco-elastic foam has the manufacturer's code T-85. A preferred range of density of the visco-elastic foam is 50 to 120 kg/m³.

For each of the above embodiments A, B, and C, the layers comprising the cushion, overlay or mattress, are adhered together using an environmentally-friendly water-based adhesive such as SABA AQUABOND RSD (trade mark), a two-component water-based adhesive produced by SABA DINXPERLO BV, B-7090 AA DINXPERLO, Belgium. Hardness is to be measured 65% compression at 20° C.

For each of the above embodiments A, B, and C, the layers comprising the cushion, overlay or mattress, once the appropriate layers of foam have been adhered together, a 2 mm thick sheet 8 of a reticulated filter polyurethane foam is adhered to each outer face of the laminated support. This layer 8 is air permeable.

The support D illustrated by FIG. 4 includes a single layer of visco-elastic foam sandwiched between two layers of reticulated filter polyurethane foam. In particular, the support D includes a sheet of visco-elastic foam 9, which is sandwiched between two sheets of reticulated polyurethane foam 8. The sheet of visco-elastic foam 9 preferably has a thickness ranging from 50 mm to 150 mm, a density ranging from 50 kg/m³ to 120 kg/m³, and a hardness ranging from 10N to 30N measured at 65% compression at 20° C.

Any of the supports A, B, C, and D may be provided with an outer covering (not shown). Two examples of outer coverings are described below.

One example is a textile net cover followed by a removable outer fabric cover. The textile net cover eases the taking on and off of the fabric cover and is made from a specially treated textile which allows the foam layers to 'breathe' whilst preventing contamination of the foam layers by fluids. An example of such netting is the 100% cotton netting manufactured by BIDET & HORST GmbH & Co KG, D-4460 Hörstel, Germany.

A second example of an outer covering is a waterproof, vapor-permeable cover made of base nylon fabric coated with polyurethane film. Preferably, this cover material is 0.25 mm thick, weighs 245 g/m², and is constructed having a single sheet top surface, no joins, welded seams and a sealed zip flap. In addition, this cover may be pretreated with an anti-bacterial agent.

The laminated support of the present invention, when covered with the polyurethane coat nylon material ensures good hygiene for patients with incontinence. The elasticity of the cover allows the pressure-relieving properties of the visco-elastic foam to be unimpaired.

Laminated supports manufactured in accordance with the present invention allow air to circulate around a patient's skin and thus avoid the discomfort of perspiration and skin irritation.

The visco-elastic foam layers provide the laminated support with its special pressure-relieving properties. The support is thus able to mould according to the weight and temperature of a body in contact therewith. When the body is moved from a particular point of contact, the support quickly regains its initial shape, ready to be re-molded.

This property of the support is different from normally polyurethane foams which bulk up when compressed, thereby exerting pressure rather than relieving it. As a result, the quality of sleep of a person reclining on a support constructed of layers of foam having visco-elastic properties is different from normal polyurethane foams which bulk up when compressed, thereby exerting pressure rather than relieving it.

In use, it is the side of the support which has the visco-elastic foam layer, or the softest visco-elastic foam layer, foremost which is arranged for contact with a person's body. As a result, the support does not need to be turned, as is customary with hospital mattresses, for example.

Various features of the invention are set forth in the following claims.

The invention claimed is:

1. A layered bed mattress for pressure-relief of a user, the bed mattress comprising:
   a first foam layer having a generally planar first support surface adapted to substantially face the user resting upon the bed mattress and having length and width dimensions sufficient to support a reclining body of an adult user, and a generally planar second surface opposite the first support surface, the first and second surfaces defining therebetween a substantially uniform undeflected thickness, the first foam layer comprising visco-elastic foam having a density of no less than 50 kg/m³ and no greater than 120 kg/m³; and
   a second foam layer having a generally planar third surface adjacent and substantially facing the second surface of the first foam layer, the second foam layer having a substantially uniform undeflected thickness greater than that of the first foam layer.

2. The layered bed mattress as claimed in claim 1, wherein the visco-elastic foam of the first foam layer is responsive to body heat from the user.

3. The layered bed mattress as claimed in claim 2, wherein the first foam layer is adhered to the second foam layer.

4. The layered bed mattress as claimed in claim 2, wherein the second foam layer has a hardness greater than that of the first foam layer.

5. The layered bed mattress as claimed in claim 3, wherein the second foam layer has a hardness greater than that of the first foam layer.

6. The layered bed mattress as claimed in claim 2, wherein the second foam layer comprises visco-elastic foam.

7. The layered bed mattress as claimed in claim 1, wherein the first foam layer is adhered to the second foam layer.

8. The layered bed mattress as claimed in claim 7, wherein the second foam layer has a hardness greater than that of the first foam layer.

9. The layered bed mattress as claimed in claim 7, wherein the second foam layer comprises visco-elastic foam.

10. The layered bed mattress as claimed in claim 1, wherein the second foam layer has a hardness greater than that of the first foam layer.

11. The layered bed mattress as claimed in claim 1, wherein the second foam layer comprises visco-elastic foam.

12. A layered bed mattress for pressure-relief of a user, the bed mattress comprising:
   a first foam layer having a generally planar first support surface adapted to substantially face the user resting upon the bed mattress and having length and width dimensions sufficient to support a reclining body of an adult user, and a generally planar second surface opposite the first support surface, the first and second surfaces defining therebetween a substantially uniform undeflected thickness, the first foam layer comprising visco-elastic foam having a density of no less than 50 kg/m$^3$ and no greater than 120 kg/m$^3$; and a second foam layer having a generally planar third surface adjacent and substantially facing the second surface of the first foam layer, the second foam layer comprising visco-elastic foam.

13. The layered bed mattress as claimed in claim 12, wherein the visco-elastic foam of the first foam layer is responsive to body heat from the user.

14. The layered bed mattress as claimed in claim 13, wherein the first foam layer is adhered to the second foam layer.

15. The layered bed mattress as claimed in claim 13, wherein the second foam layer has a hardness greater than that of the first foam layer.

16. The layered bed mattress as claimed in claim 14, wherein the second foam layer has a hardness greater than that of the first foam layer.

17. The layered bed mattress as claimed in claim 12, wherein the first foam layer is adhered to the second foam layer.

18. The layered bed mattress as claimed in claim 17, wherein the second foam layer has a hardness greater than that of the first foam layer.

19. The layered bed mattress as claimed in claim 12, wherein the second foam layer has a hardness greater than that of the first foam layer.

20. A layered bed mattress for pressure-relief of a user, the bed mattress comprising:

a first foam layer having a generally planar first support surface adapted to substantially face the user resting upon the bed mattress and having length and width dimensions sufficient to support a reclining body of an adult user, and a generally planar second surface opposite the first support surface, the first and second surfaces defining therebetween a substantially uniform undeflected thickness, the first foam layer comprising visco-elastic foam having a density of no less than 50 kg/m$^3$ and no greater than 120 kg/m$^3$; and a second foam layer having a generally planar third surface adjacent and substantially facing the second surface of the first foam layer, the second foam layer having a density less than that of the first foam layer and a hardness greater than that of the first foam layer.

21. The layered bed mattress as claimed in claim 20, wherein the second foam layer is thicker than the first foam layer.

22. The layered bed mattress as claimed in claim 21, wherein the visco-elastic foam of the first foam layer is responsive to body heat from the user.

23. The layered bed mattress as claimed in claim 21, wherein the first foam layer is adhered to the second foam layer.

24. The layered bed mattress as claimed in claim 21, wherein the second foam layer comprises visco-elastic foam.

25. The layered bed mattress as claimed in claim 20, wherein the visco-elastic foam of the first foam layer is responsive to body heat from the user.

26. The layered bed mattress as claimed in claim 20, wherein the first foam layer is adhered to the second foam layer.

27. The layered bed mattress as claimed in claim 20, wherein the second foam layer comprises visco-elastic foam.

* * * * *

UNITED STATES PATENT AND TRADEMARK OFFICE
CERTIFICATE OF CORRECTION

| | | |
|---|---|---|
| PATENT NO. | : 7,507,468 B2 | Page 1 of 1 |
| APPLICATION NO. | : 10/403255 | |
| DATED | : March 31, 2003 | |
| INVENTOR(S) | : Dag Landvik and Michael B. Allaway | |

It is certified that error appears in the above-identified patent and that said Letters Patent is hereby corrected as shown below:

On the Title page of the patent at Item (30), correct Foreign Application Priority Dates: "Mar. 6, 1994" should be "June 3, 1994" and "Sep. 6, 1994" should be "June 9, 1994" for GB9411120.0 and GB9411504.5, respectively.

Signed and Sealed this

Ninth Day of June, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,507,468 B2 | Page 1 of 1 |
| APPLICATION NO. | : 10/403255 | |
| DATED | : March 24, 2009 | |
| INVENTOR(S) | : Dag Landvik and Michael B. Allaway | |

It is certified that error appears in the above-identified patent and that said Letters Patent is hereby corrected as shown below:

On the Title page of the patent at Item (30), correct Foreign Application Priority Dates: "Mar. 6, 1994" should be "June 3, 1994" and "Sep. 6, 1994" should be "June 9, 1994" for GB9411120.0 and GB9411504.5, respectively.

This certificate supersedes the Certificate of Correction issued June 9, 2009.

Signed and Sealed this

Seventh Day of July, 2009

JOHN DOLL
*Acting Director of the United States Patent and Trademark Office*

(12) INTER PARTES REEXAMINATION CERTIFICATE (1191st)
United States Patent
Landvik et al.

(10) Number: US 7,507,468 C1
(45) Certificate Issued: *Oct. 19, 2015

(54) LAMINATED VISCO-ELASTIC SUPPORT

(75) Inventors: Dag Landvik, Saltsjo-Duvnas (SE); Michael B. Allaway, Paris (FR)

(73) Assignee: BANK OF AMERICA, N.A., Dallas, TX (US)

Reexamination Request:
No. 95/000,494, Oct. 21, 2009

Reexamination Certificate for:
Patent No.: 7,507,468
Issued: Mar. 24, 2009
Appl. No.: 10/403,255
Filed: Mar. 31, 2003

Certificate of Correction issued Jun. 9, 2009
Certificate of Correction issued Jul. 7, 2009

( * ) Notice: This patent is subject to a terminal disclaimer.

Related U.S. Application Data

(63) Continuation of application No. 09/703,893, filed on Nov. 1, 2000, now Pat. No. 6,541,094, and a continuation of application No. 08/458,968, filed on Jun. 2, 1995, now Pat. No. 6,159,574.

(30) Foreign Application Priority Data

Jun. 3, 1994 (GB) .................................. 9411120.0
Jun. 9, 1994 (GB) .................................. 9411504.5

(51) Int. Cl.
*B32B 3/26* (2006.01)
*A47C 27/15* (2006.01)
*B32B 7/02* (2006.01)

(52) U.S. Cl.
CPC .. *A47C 27/15* (2013.01); *B32B 7/02* (2013.01)

(58) Field of Classification Search
USPC .......................................................... 428/71
See application file for complete search history.

(56) References Cited

To view the complete listing of prior art documents cited during the proceeding for Reexamination Control Number 95/000,494, please refer to the USPTO's public Patent Application Information Retrieval (PAIR) system under the Display References tab.

*Primary Examiner* — Terrence Till

(57) ABSTRACT

A laminated support for pressure-relief comprising an upper layer of visco-elastic foam, a middle layer of visco-elastic foam having a greater hardness, and a bottom layer of highly resilient polyurethane foam. These layers are sandwiched between two layers of reticulated filter polyurethane foam.

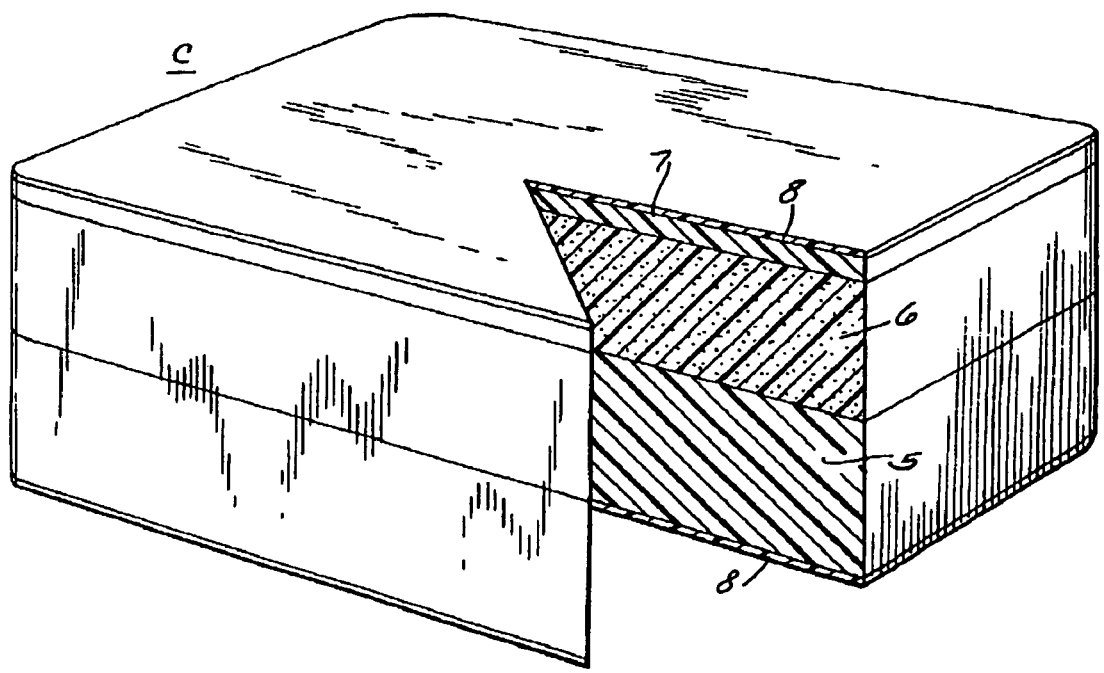

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-27 are cancelled.

* * * * *